(12) United States Patent
Chae

(10) Patent No.: US 11,583,154 B2
(45) Date of Patent: Feb. 21, 2023

(54) ARTIFICIAL INTELLIGENCE CLEANER AND METHOD OF OPERATING THE SAME

(71) Applicant: LG ELECTRONICS INC., Seoul (KR)

(72) Inventor: Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 605 days.

(21) Appl. No.: 16/497,779

(22) PCT Filed: Mar. 27, 2019

(86) PCT No.: PCT/KR2019/003533
§ 371 (c)(1),
(2) Date: Sep. 25, 2019

(87) PCT Pub. No.: WO2020/196948
PCT Pub. Date: Oct. 1, 2020

(65) Prior Publication Data
US 2021/0321848 A1 Oct. 21, 2021

(51) Int. Cl.
*A47L 9/28* (2006.01)
*A47L 9/00* (2006.01)
*B25J 9/00* (2006.01)
*B25J 9/16* (2006.01)
(Continued)

(52) U.S. Cl.
CPC ............ *A47L 9/2826* (2013.01); *A47L 9/009* (2013.01); *A47L 9/2852* (2013.01);
(Continued)

(58) Field of Classification Search
None
See application file for complete search history.

(56) References Cited

U.S. PATENT DOCUMENTS

2005/0149228 A1 7/2005 Lee
2005/0171636 A1* 8/2005 Tani ..................... G05D 1/0276
701/23
(Continued)

FOREIGN PATENT DOCUMENTS

JP 2005192994 7/2005
KR 1020050110466 11/2005
(Continued)

OTHER PUBLICATIONS

English Machine Translation of KR20180080935A.*
(Continued)

*Primary Examiner* — Mikhail Kornakov
*Assistant Examiner* — Pradhuman Parihar
(74) *Attorney, Agent, or Firm* — Lee, Hong, Degerman, Kang & Waimey PC

(57) ABSTRACT

An artificial intelligence (AI) cleaner according to an embodiment of the present invention may include a memory, a movement detect sensor, a driving unit configured to allow the AI cleaner to be moved, and a processor configured to control the movement sensor to sense a movement of the AI cleaner by a user and acquire a position to which the AI cleaner has moved while the AI cleaner operates at a first cleaning mode and control the driving unit to allow the AI cleaner to clean a priority cleaning area corresponding to the position at a second cleaning mode.

6 Claims, 8 Drawing Sheets

(51) Int. Cl.
  *B25J 11/00* (2006.01)
  *G05B 19/4155* (2006.01)
(52) U.S. Cl.
  CPC ........... *B25J 9/0003* (2013.01); *B25J 9/1666* (2013.01); *B25J 11/0085* (2013.01); *G05B 19/4155* (2013.01); *A47L 2201/04* (2013.01); *A47L 2201/06* (2013.01); *G05B 2219/45098* (2013.01)

(56) References Cited

U.S. PATENT DOCUMENTS

2015/0032259 A1* 1/2015 Kim ................... A47L 11/4008
  700/255
2018/0168414 A1* 6/2018 Jee ....................... A47L 9/2894

FOREIGN PATENT DOCUMENTS

| KR | 20080006074 A | * | 1/2008 | ........... A47L 9/2857 |
|---|---|---|---|---|
| KR | 1020089006074 | | 1/2008 | |
| KR | 1020150014113 | | 2/2015 | |
| KR | 20180080935 A | * | 7/2018 | ............... A47L 5/22 |
| KR | 1020180080935 | | 7/2018 | |

OTHER PUBLICATIONS

English Machine Translation of KR20080006074A.*
PCT International Application No. PCT/KR2019/003533, Written Opinion of the International Searching Authority dated Dec. 12, 2019, 8 pages.

* cited by examiner

ARTIFICIAL INTELLIGENCE CLEANER AND METHOD OF OPERATING THE SAME

CROSS-REFERENCE TO RELATED APPLICATIONS

This application is the National Stage filing under 35 U.S.C. 371 of International Application No. PCT/KR2019/003533, filed on Mar. 27, 2019, the contents of which are hereby incorporated by reference herein in its entirety.

TECHNICAL FIELD

Embodiments relate to an artificial intelligence cleaner, and more particularly, to an artificial intelligence cleaner capable of automatically cleaning an area which a user desires to clean first.

BACKGROUND ART

A robot cleaner is a device for automatically performing a cleaning job by sucking foreign substances such as dust from a floor surface while driving by itself in an area to be cleaned without a user's manipulation.

Such a robot cleaner is configured to perform a cleaning job while driving along a cleaning route which has been predetermined according to an internal stored program.

The user does not know the cleaning route of the robot cleaner. Therefore, in the case that there is an area which the user desires to clean first, the user should wait for the robot cleaner until it arrives at the area or should change the operation mode of the robot cleaner to a manual mode by using a remote controller and move the robot cleaner to a desired place by using the direction key of the remote controller.

Even in this case, when the user himself moves the robot cleaner to the area which the user desires to clean, the robot cleaner still runs according to the preset route and does not clean necessarily clean the area which the user desires to clean, which is a problem.

DISCLOSURE OF THE INVENTION

Technical Problem

An object of the present invention is to provide an artificial intelligence cleaner that can easily clean an area which a user desires to clean first based on the sensing information and the location of the artificial intelligence cleaner.

An object of the present invention is to provide an artificial intelligence cleaner which can first obtain information on a priority cleaning area and perform an intensive cleaning on the priority cleaning area.

An object of the present invention is to provide an artificial intelligence cleaner that can distinguish the movement of the artificial intelligence cleaner according to the detection of an obstacle and the movement of the artificial intelligence cleaner for the priority cleaning area.

Technical Solution

An artificial intelligence cleaner according to an embodiment of the present invention may detect the movement of the artificial intelligence cleaner by the user by using sensing information acquired through a movement detect sensor, and clean a recognized priority cleaning area corresponding to the moved position.

The artificial intelligence cleaner according to an embodiment of the present invention may first switch the operation mode from a general cleaning mode to a meticulous cleaning mode in order to clean the priority cleaning area.

The artificial intelligence cleaner according to an embodiment of the present invention may determine whether an obstacle is detected, and when the obstacle is not detected, if a movement of the artificial intelligence cleaner is detected, it may be determined that the artificial intelligence cleaner has been moved by the user.

Advantageous Effects

According to an embodiment of the present invention, an area which a user desires to clean first can be quickly cleaned, thereby enhancing the satisfaction of the user.

According to an embodiment of the present invention, since visual information of the user is reflected, the cleaning of a cleaning area that may be overlooked by the robot cleaner may be performed more cleanly.

BEST MODE

Figure 1:
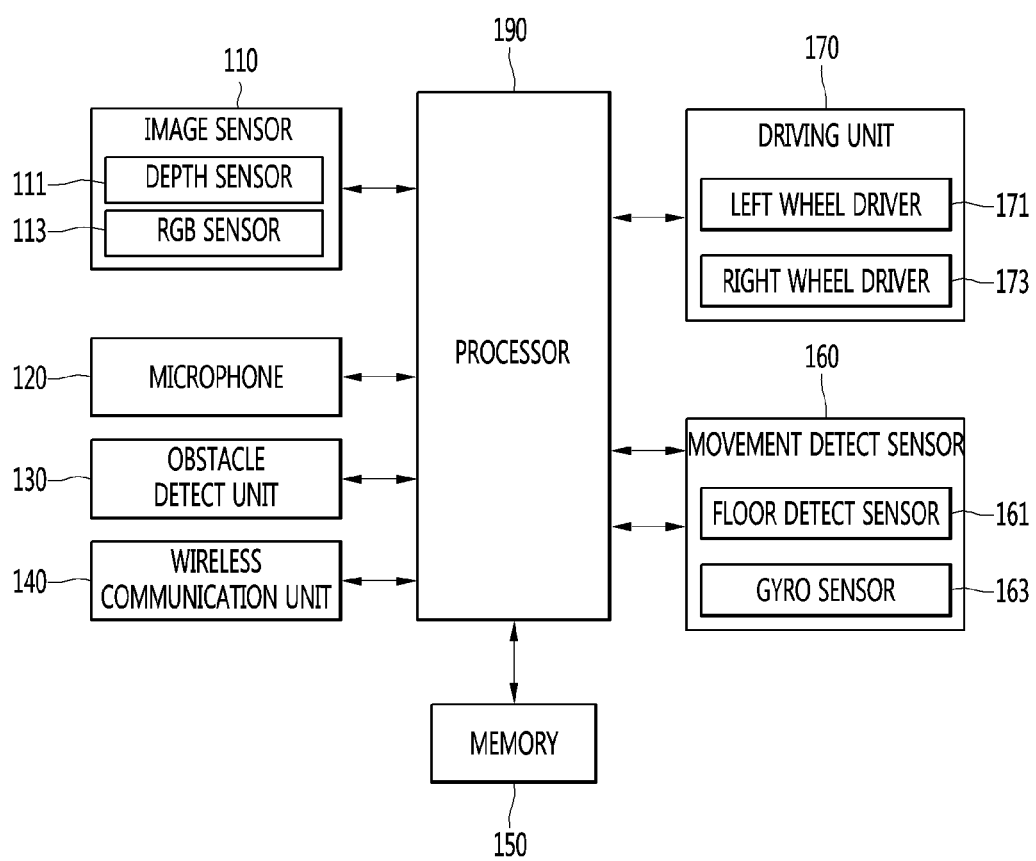
FIG. 1 is a block diagram illustrating a configuration of an artificial intelligence cleaner according to an embodiment of the present invention.

Hereinafter, embodiments of the present disclosure are described in detail with reference to the accompanying drawings, and the same or similar components are denoted by the same reference numerals regardless of the symbols used in the drawings, and redundant description thereof will be omitted. The suffix "module" and "unit" for the components used in the following description are given or mixed in consideration of easy writing, and do not have their own meaning or role.

FIG. 1 is a block diagram illustrating a configuration of an artificial intelligence cleaner according to an embodiment of the present invention.

Referring to FIG. 1, the artificial intelligence cleaner 100 according to an exemplary embodiment of the present invention may include an image sensor 110, a microphone 120, an obstacle detector 130, a wireless communication unit 140, a memory 150, and a movement detect sensor 160, a driving unit 170, and a processor 190.

The image sensor 110 may obtain image data about the surroundings of the artificial intelligence cleaner 100.

The image sensor 110 may include one or more of a depth sensor 111 and a RGB sensor 113.

The depth sensor 111 may detect that light emitted from a light emitter (not shown) is reflected by an object and returned. The depth sensor 111 may measure a distance to the object based on a time difference of sensing the returned light, the amount of the returned light, and the like.

The depth sensor 111 may obtain 2D image information or 3D image information about the surroundings of the cleaner 100 based on the measured distance between objects.

The RGB sensor 113 may acquire color image information about at least one object around the cleaner 100. The color image information may be a captured image of the object. The RGB sensor 113 may be named as an RGB camera.

The obstacle detector 130 may include an ultrasonic sensor, an infrared sensor, a laser sensor, and the like. For example, the obstacle detector 130 may irradiate laser light to a cleaning area and extract a pattern of reflected laser light.

The obstacle detector 130 may detect an obstacle based on the position and pattern of the extracted laser light.

When the depth sensor 110 is used to detect an obstacle, the configuration of the obstacle detector 130 may be omitted.

The wireless communication unit 140 may include at least one of a wireless internet module and a short range communication module.

A mobile communication module sends/receives wireless signals to/from at least one of a base station, an external terminal, and a server on a mobile communication network which is established according to technical standards or communication methods for mobile communication (e.g., Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless internet module refers to a module for wireless internet access and may be installed inside or outside the cleaner 100. The wireless internet module is configured to transmit and receive wireless signals in a communication network according to wireless internet technologies.

Examples of wireless Internet technologies include Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc.

The short range communication module is for short range communication, and may support short range communication by using at least one of Bluetooth™, Radio Frequency Identification (RFID), Infrared Data Association (IrDA), Ultra Wideband (UWB), ZigBee, and Near Field Communication (NFC), Wireless-Fidelity (Wi-Fi), Wi-Fi Direct, and Wireless Universal Serial Bus (Wireless USB) technologies.

The memory 150 may store a SLAM map which is created using SLAM algorithm.

The movement detect sensor 160 may detect the movement of the artificial intelligence cleaner 100. Specifically, the movement detect sensor 160 may detect that the artificial intelligence cleaner 100 is lifted and moved by the user.

The movement detect sensor 160 may include one or more of a floor detect sensor 161 and a gyro sensor 163.

The floor detect sensor 161 may detect whether the artificial intelligence cleaner 100 is moved by the user by using infrared rays. Detailed description thereof will be described later.

The gyro sensor 163 may measure the angular velocity of the artificial intelligence cleaner 100 for each of the x-axis, the y-axis, and the z-axis. The gyro sensor 163 may detect the movement of the artificial intelligence cleaner 100 by the user by using the angular velocity change amount for each axis.

In addition, the movement detect sensor 160 may include a wheel sensor, a cliff sensor, and the like, and may detect movement of the artificial intelligence cleaner 100 by the user by using the sensors.

The driving unit 170 may move the artificial intelligence cleaner 100 in a specific direction or by a specific distance.

The driving unit 170 may include a left wheel driver 171 for driving the left wheel of the artificial intelligence cleaner 100 and a right wheel driver 173 for driving the right wheel of the artificial intelligence cleaner 100.

The left wheel driver 171 may include a motor for driving the left wheel, and the right wheel driver 173 may include a motor for driving the right wheel.

FIG. 1 illustrates that the driving unit 170 includes the left wheel driver 171 and the right wheel driver 173 as an example, but the present invention is not limited to this example, and if there is only one wheel, only one driver may be provided.

The processor 190 may control the overall operation of the artificial intelligence cleaner 100.

The processor 190 may control the driving unit 170 to move cleaner 100 according to a cleaning route at a first cleaning mode.

The processor 190 may acquire sensing information through the movement detect sensor 160 while the cleaner 100 is moved at the first cleaning mode.

The processor 190 may sense the movement of the artificial intelligence cleaner 100 by the user by using the sensing information.

The processor 190 may determine whether the movement of the artificial intelligence cleaner 100 is detected in the normal cleaning state.

When the movement of the artificial intelligence cleaner 100 is detected in the normal cleaning state, the processor 190 may acquire a position to which the artificial intelligence cleaner 100 has been moved.

If in the abnormal cleaning state, the movement of the artificial intelligence cleaner 100 is detected, the processor 190 may perform cleaning according to the first cleaning mode.

The processor 190 may determine whether the artificial intelligence cleaner 100 has been moved to the location of the charger by using the position where the artificial intelligence cleaner 100 has been moved.

When it is determined that the artificial intelligence cleaner 100 has been moved to the location of the charger, the processor 190 may receive power from the charger.

When the processor 190 determines that the artificial intelligence cleaner 100 has not been moved to the position of the charger, the processor 190 changes the operation mode of the artificial intelligence cleaner 100 from the first cleaning mode to the second cleaning mode and may perform a cleaning for a cleaning area corresponding to the moved position.

When the cleaning of the moved cleaning area is completed, the processor 190 may change the operation mode of the artificial intelligence cleaner 100 from the second cleaning mode to the first cleaning mode, and may move along the cleaning route in the first cleaning mode.

A detailed operation of the processor 190 will be described later.

Figure 2:
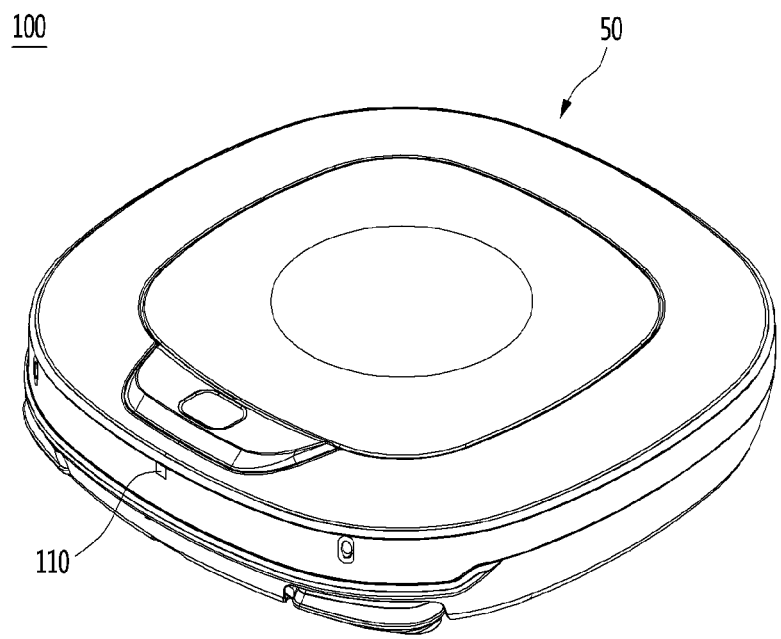
FIG. 2 is a plan view of an artificial intelligence cleaner according to an embodiment of the present invention.
Figure 3:
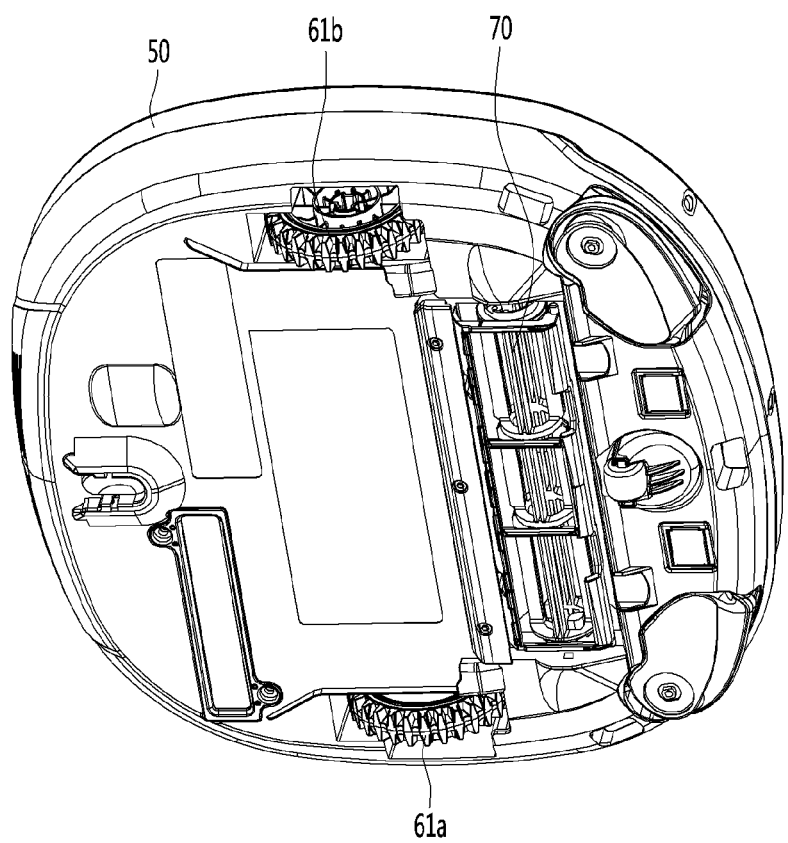
FIG. 3 is a bottom view of an artificial intelligence cleaner according to an embodiment of the present invention.

FIG. 2 is a perspective view of an artificial intelligence cleaner according to an embodiment of the present invention, and FIG. 3 is a bottom view of an artificial intelligence cleaner according to an embodiment of the present invention.

Referring to FIG. 2, the artificial intelligence cleaner 100 may include a cleaner body 50 and an image sensor 110 provided on an upper surface of the cleaner body 50.

The image sensor 110 may irradiate light to the front and receive the reflected light.

The image sensor 110 may acquire depth information by using a return time of the received light.

The cleaner body 50 may include other components except the image sensor 110 among the components described with reference to FIG. 1.

Referring to FIG. 3, the artificial intelligence cleaner 100 may further include a cleaner body 50, a left wheel 61a, a right wheel 61b, and a suction unit 70 in addition to the configuration of FIG. 1.

The left wheel 61a and the right wheel 61b can move the cleaner main body 50.

The left wheel driver 171 may drive the left wheel 61a, and the right wheel driver 173 may drive the right wheel 61b.

As the left wheel 61a and the right wheel 61b are rotated by the driving unit 170, foreign substances such as dust or garbage may be sucked through the suction unit 70.

The suction unit 70 may be provided in the cleaner body 50 to suck dust from the bottom surface.

The suction unit 70 may further include a filter (not shown) that collects foreign matters from the suctioned airflow, and a foreign matter receiver (not shown), in which foreign matters collected by the filter are accumulated, may be further provided.

Figure 4:
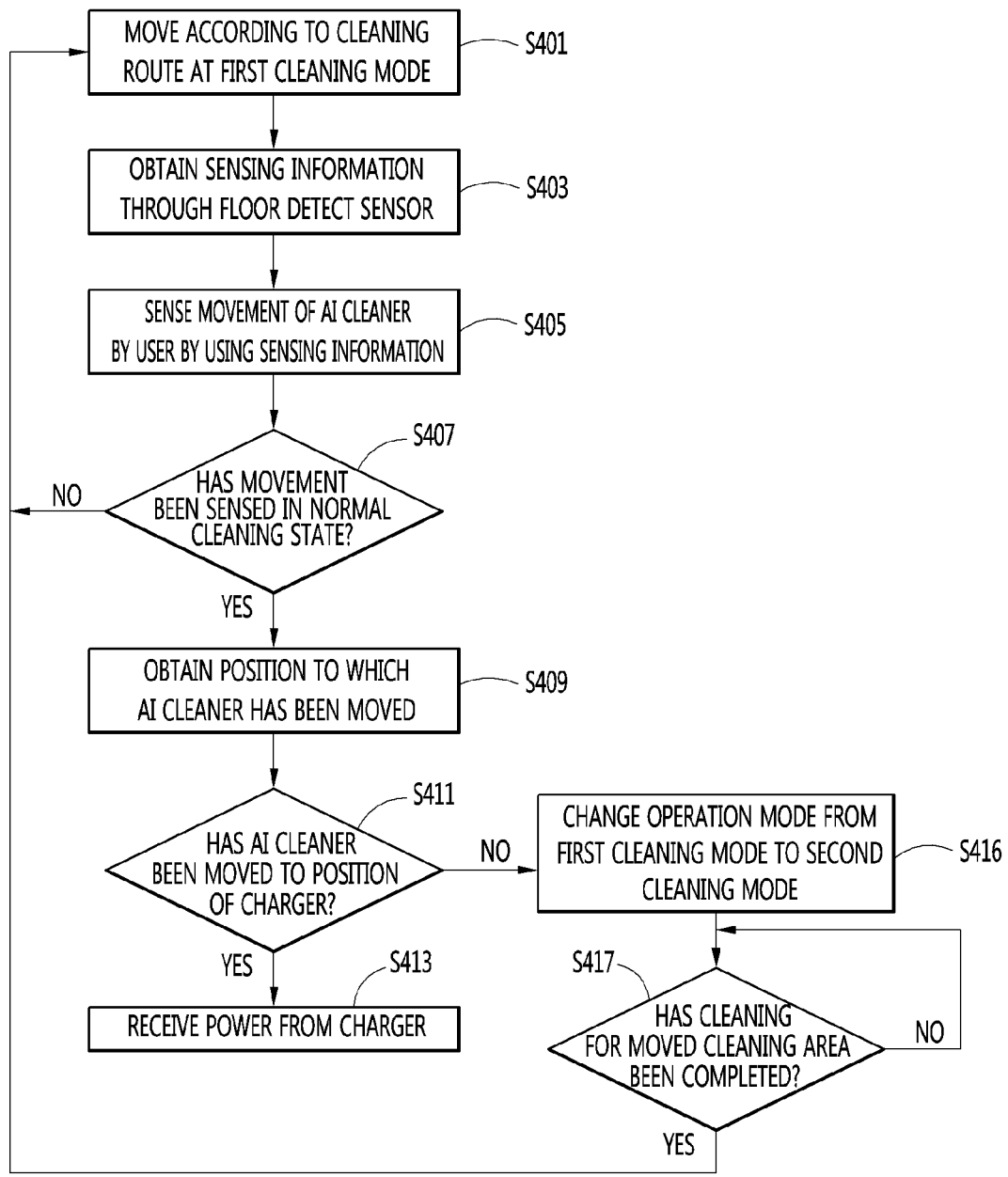
FIG. 4 is a flowchart illustrating a method of operating an artificial intelligence cleaner according to an embodiment of the present invention.

FIG. 4 is a flowchart illustrating a method of operating an artificial intelligence cleaner according to an embodiment of the present invention.

The processor 190 of the artificial intelligence cleaner 100 controls the driving unit 170 to move the cleaner 100 according to the cleaning route at the first cleaning mode (S401).

In one embodiment, the operation mode of the artificial intelligence cleaner 100 may include a plurality of cleaning modes.

The plurality of cleaning modes may include a first cleaning mode representing a general cleaning mode and a second cleaning mode representing a meticulous cleaning mode (or an intensive cleaning mode).

In the meticulous cleaning mode (or intensive cleaning mode), compared to the general cleaning mode, the cleaning time for the cleaning area by the artificial intelligence cleaner 100 is longer, and may be a mode for strengthening the suction force of dust.

The meticulous cleaning mode may be a mode for performing cleaning while moving in the designated cleaning area in a zigzag form.

The processor 190 may acquire sensing information through the movement detect sensor 160 while the cleaner 100 is moved at the first cleaning mode (S403).

The processor 190 may receive sensing information sensed by the movement detect sensor 160 in real time or at a predetermined cycle while the cleaner 100 is moved at the first cleaning mode.

The movement detect sensor 160 may be used to detect whether the artificial intelligence cleaner 100 is lifted by the user and away from the floor.

The movement detect sensor 160 may include a light emitting unit emitting infrared rays and a light receiving unit receiving emitted infrared rays.

The movement detect sensor 160 may measure a time when the infrared light emitted from the light emitting enters the light receiving unit.

When measured time is equal to or greater than preset time, the movement detect sensor 160 may determine that the artificial intelligence cleaner 100 has been lifted and is currently moved by the user.

The fact that the measured time is large may indicate that the artificial intelligence cleaner 100 is far from the floor.

If the measured time is less than the preset time, the movement sensor 160 may determine that the artificial intelligence cleaner 100 is cleaning the floor.

The sensing information may include a time that is spent in a return, to the light receiving unit, of the infrared rays emitted from the light emitting unit, information on the state in which the artificial intelligence cleaner 100 is away from the floor and is currently moved by the user, and information on the state in which the cleaner 100 is currently cleaning the floor.

The processor 190 may sense the movement of the artificial intelligence cleaner 100 by the user by using the sensing information (S405).

The processor 190 may detect whether the artificial intelligence cleaner 100 has been moved by the user by using the movement detect sensor 160.

The movement detect sensor 160 may include one or more of a floor detect sensor 161 and a gyro sensor 163.

The floor detect sensor 161 may detect whether the artificial intelligence cleaner 100 is moved by the user by using infrared rays.

The floor detect sensor 161 may include a light emitting unit that emits infrared light and a light receiving unit that receives the emitted infrared light.

The floor detect sensor 161 may measure a time when the infrared light emitted from the light emitting enters the light receiving unit.

The processor 190 may detect whether the artificial intelligence cleaner 100 has been moved by the user based on the time when the infrared light emitted from the light emitting unit enters the light receiving unit, which is measured by the floor detect sensor 161.

When the flying time for which the infrared light emitted from the light emitting unit enters the light receiving is greater than or equal to a preset time, the processor 190 may determine that the artificial intelligence cleaner 100 has been moved by the user. The preset time may be 1 second, but this is only an example.

In another example, the processor 190 may use the gyro sensor 163 to detect whether the artificial intelligence cleaner 100 has been moved by the user.

The gyro sensor 163 may measure the angular velocity of the artificial intelligence cleaner 100 for each of the x-axis, the y-axis, and the z-axis.

The processor 190 may determine whether the artificial intelligence cleaner 100 has been moved by the user based on the change amount of the angular velocity with respect to each axis.

In detail, when the amount of change in the angular velocity with respect to each axis is greater than or equal to a preset change amount, the processor 190 may determine that the artificial intelligence cleaner 100 has been moved by the user.

The processor 190 may determine whether the movement of the artificial intelligence cleaner 100 is detected in the normal cleaning state (S407).

The normal cleaning state may be a state in which a cleaning is performed by the artificial intelligence cleaner 100 without an obstacle being detected. That is, the normal cleaning state may be a state in which the artificial intelligence cleaner 100 has not detected an obstacle and currently performs cleaning according to a cleaning route.

The abnormal cleaning state may be a state in which the artificial intelligence cleaner 100 has detected an obstacle and thus the cleaning is impossible.

In an abnormal cleaning state, the processor 190 may sound a notification indicating that an obstacle has been detected and thus cleaning is impossible.

The processor 190 may determine whether the movement of the artificial intelligence cleaner 100 by the user has been detected in the normal cleaning state, or the movement of the cleaner 100 by the user has been detected in the abnormal cleaning state.

When the movement of the artificial intelligence cleaner 100 is detected in the normal cleaning state, the processor 190 may acquire a position to which the artificial intelligence cleaner 100 has been moved (S409).

When the movement of the artificial intelligence cleaner 100 is detected in the normal cleaning state, the processor 190 may acquire the position to which the cleaner 100 has been moved in order to determine whether the user's intention of the movement is to first clean a specific cleaning area or to charge the cleaner 100.

The memory 150 may store a simultaneous localization and mapping (SLAM) map for the interior of the house, which is obtained by using SLAM algorithm.

The processor 190 may determine the location where the artificial intelligence cleaner 100 has been moved by using the SLAM map.

The processor 190 may measure the flight time of the infrared rays emitted to the floor detect sensor 161 when detecting the movement of the artificial intelligence cleaner 100 by the user by using the floor detect sensor 161.

The processor 190 may determine that the artificial intelligence cleaner 100 is placed on the floor when the flight time of infrared rays is less than the preset time.

When the processor 190 determines that the artificial intelligence cleaner 100 is placed on the floor, the processor 190 may acquire information on the position of the artificial intelligence cleaner 100 at the corresponding time point.

The processor 190 may recognize where the artificial intelligence cleaner 100 is located in the SLAM map after the artificial intelligence cleaner 100 has been moved by the user.

To this end, the processor 190 may obtained image data through the image sensor 100, then compare the obtained image data with the previously stored images to search for a matched image, and determine the coordinates corresponding to the matched image as the position of the artificial intelligence cleaner 100.

The memory 150 may store the plurality of images and coordinates corresponding to each of the plurality of images, which are acquired when the artificial intelligence cleaner 100 prepares the SLAM map.

The processor 190 may extract the image, stored in the memory 150, matched with the image which is acquired at the time when the cleaner 100 is moved by the user and is placed on the floor and may determine the coordinates corresponding to the extracted image as the current position of the cleaner 100.

The processor 190 may store the acquired position of the artificial intelligence cleaner 100 in the memory 150.

The location of the stored artificial intelligence cleaner 100 may be later reflected on the cleaning route.

For example, the processor 190 may change the operation mode from the first cleaning mode to the second cleaning mode when reaching the location of the artificial intelligence cleaner 100 the preset cleaning route.

As another example, the processor 190 may modify an existing cleaning route based on the location of the artificial intelligence cleaner 100 moved by the user. In detail, the processor 190 may change the existing cleaning route into a new cleaning route by using the location of the artificial intelligence cleaner 100 as a new starting point.

As another example, the processor 190 may clean the cleaning area corresponding to the position of the artificial intelligence cleaner 100 moved by the user, then may return to the position before being moved by the user and perform cleaning according to the existing cleaning route.

If in the abnormal cleaning state, the movement of the artificial intelligence cleaner 100 is detected, the processor 190 may perform cleaning according to the first cleaning mode.

This is a case where, when the artificial intelligence cleaner 100 does not properly performing cleaning after detection of an obstacle, the user moves the artificial intelligence cleaner 100 to avoid the obstacle.

Meanwhile, the processor 190 may determine whether the artificial intelligence cleaner 100 has been moved to the location of the charger by using the position where the artificial intelligence cleaner 100 has been moved (S411).

The SLAM map may include coordinates of a charger capable of charging the artificial intelligence cleaner 100.

The processor 190 may determine that the artificial intelligence cleaner 100 has been moved to the location of the charger when the artificial intelligence cleaner 100 has been moved to the coordinates where the charger is located.

As another example, the processor 190 may determine that the artificial intelligence cleaner 100 has been moved to the location of the charger when power is supplied to a power supply unit (not shown) of the artificial intelligence cleaner 100.

When it is determined that the artificial intelligence cleaner 100 has been moved to the location of the charger, the processor 190 may receive power from the charger (S413).

When the processor 190 determines that the artificial intelligence cleaner 100 has not been moved to the position of the charger, the processor 190 changes the operation mode of the artificial intelligence cleaner 100 from the first cleaning mode to the second cleaning mode (S415) and may perform a cleaning for a cleaning area corresponding to the moved position.

The first cleaning mode may be a general cleaning mode, and the second cleaning mode may be a meticulous cleaning mode (or an intensive cleaning mode).

If the artificial intelligence cleaner 100 is detected to have been moved by the user to a place other than the position of the charger, the area around the position may be a priority cleaning area which the user desires to perform cleaning first.

If the cleaning mode of the artificial intelligence cleaner 100 is automatically switched to clean the priority cleaning area, the area desired by the user may be cleaned quickly and cleanly.

In addition, since the user's visual information is reflected more accurately than the visual information of the artificial intelligence cleaner 100 and the cleaning is performed, a dirty area, which the artificial intelligence cleaner 100 may have not found, can be cleaned cleanly.

When the cleaning of the moved cleaning area is completed (S417), the processor 190 may change the operation mode of the artificial intelligence cleaner 100 from the second cleaning mode to the first cleaning mode, and may move along the cleaning route in the first cleaning mode (S401).

The processor 190 may control the driving unit 170 to move the cleaner 100 according to the original cleaning route when the cleaning of the priority cleaning area is completed.

That is, when the cleaning of the priority cleaning area is completed, the processor 190 may control the driving unit 170 to move the cleaner 100 to a position before being moved by the user to thereby perform cleaning according to the existing cleaning route.

To this end, the processor 190 may have stored the existing location of the artificial intelligence cleaner 100 in the memory 150 at the point of time when the artificial intelligence cleaner 100 is moved by the user.

The processor 190 may control the driving unit 170 to move the cleaner 100 to return to an existing position stored in the memory 150 after cleaning the priority cleaning area.

Figure 5:
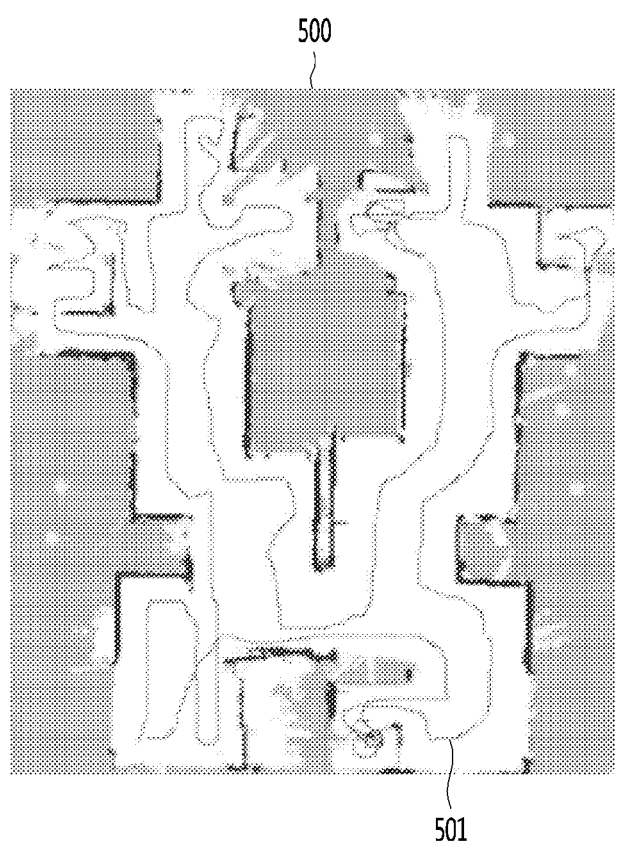
FIGS. 5 and 6 are views illustrating a positional movement of an artificial intelligence cleaner on a SLAM map according to an embodiment of the present invention.
Figure 6:
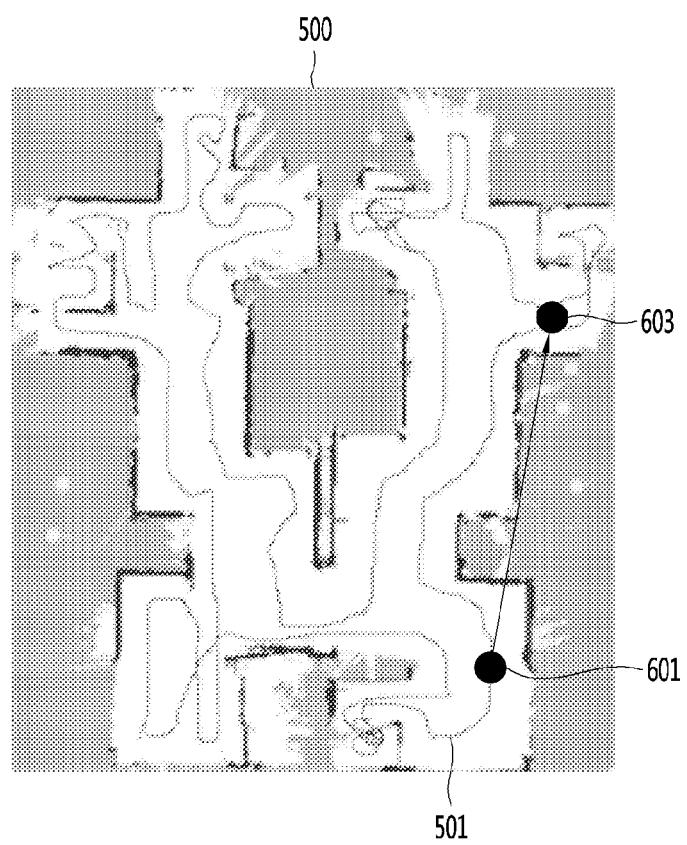

FIGS. 5 and 6 are views illustrating a positional movement of an artificial intelligence cleaner 100 on a SLAM map according to an embodiment of the present invention.

Referring to FIG. 5, the cleaning route 510 of the artificial intelligence cleaner 100 is illustrated in the previously prepared SLAM map 500.

The processor 190 may create a SLAM map 500 using the SLAM. The processor 190 may control the driving unit 170 to move the cleaner 100 according to the cleaning route 510 which is preset on the SLAM map 500.

As illustrated in FIG. 6, the processor 190 may detect that the cleaner 100 is moved by the user from the first position 601 to the second position 603 on the SLAM map 500.

The processor 190 may store the coordinates of each of the first position 601 and the second position 603 in the memory 150.

The processor 190 may first obtain a priority cleaning area based on the second position 603 moved by the user, change the cleaning mode with respect to the priority cleaning area, and perform cleaning.

The processor 190 may change the operation mode from the first cleaning mode to the second cleaning mode and clean the priority cleaning area corresponding to the second position 603 at the changed second cleaning mode.

Figure 7:
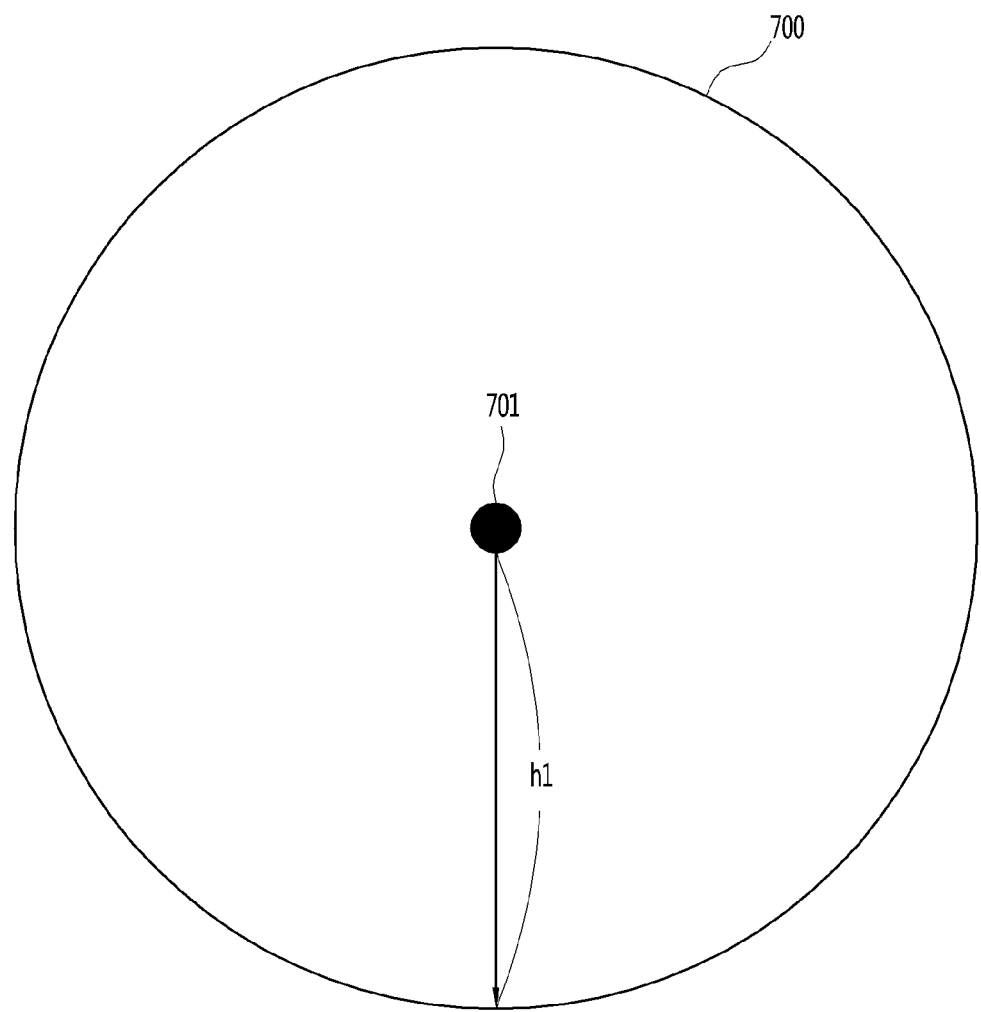
FIG. 7 is a view illustrating an example of selecting a priority cleaning area from a position to which an artificial intelligence cleaner has been moved according to an embodiment of the present invention.

FIG. 7 is a view illustrating an example of selecting a priority cleaning area from a position to which an artificial intelligence cleaner has been moved according to an embodiment of the present invention.

Referring to FIG. 7, the location 701 to which the artificial intelligence cleaner 100 has been moved by the user is illustrated.

The processor 190 may obtain a circular area 700 having a radius h1 on the basis of the location 701.

The processor 190 may regard the circular area 700 as the priority cleaning area 700 that the user desires to clean first.

Figure 8:
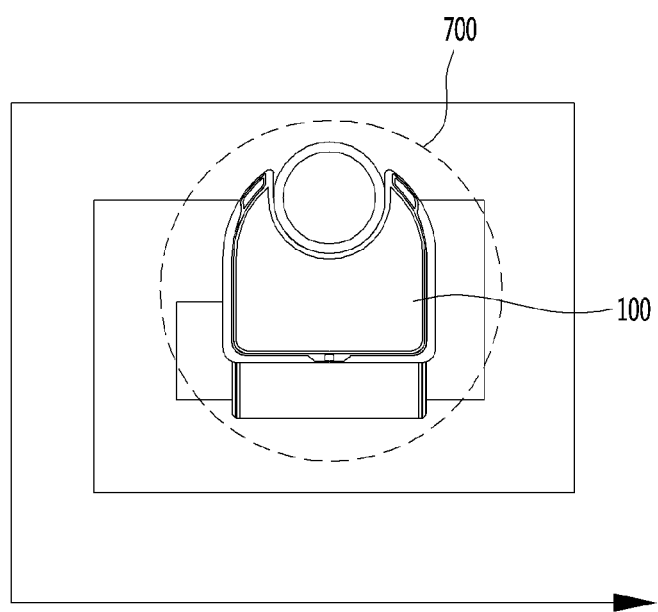
FIG. 8 is a view illustrating an example of an artificial intelligence cleaner performing a cleaning at a meticulous cleaning mode for a designated cleaning area according to an embodiment of the present invention.

FIG. 8 is a view illustrating an example of an artificial intelligence cleaner performing a cleaning at a meticulous cleaning mode for a designated cleaning area according to an embodiment of the present invention.

Referring to FIG. 8, a priority cleaning area 700 is shown.

The artificial intelligence cleaner 100 may first move in a zigzag manner in the priority cleaning area 700 to clean the priority cleaning area 700.

The artificial intelligence cleaner 100 may first switch the operation mode to the normal cleaning mode after the cleaning for the priority cleaning area 700 is completed.

As described above, according to an exemplary embodiment of the present invention, the priority cleaning area may be cleaned first by using visual information of the user having a high accuracy in finding a dirty place.

When the processor 190 detects that the cleaner has been moved by the user to the priority cleaning area 700 by the user more than a predetermined number of times, the priority cleaning area may be determined as a cleaning interest area. The predetermined number of times may be 3, but this is merely an example.

When the artificial intelligence cleaner 100 enters a cleaning interest area while performing cleaning according to the cleaning route at the general cleaning mode, the processor 190 may change the general cleaning mode to the meticulous cleaning mode.

That is, the processor 190 may change the cleaning mode for the cleaning interest area to thereby perform the cleaning more intensively without the user's request.

Accordingly, the cleaning may be automatically performed on the area in which the cleaning is not performed well or the area in which the user desires to be cleaned, thereby enhancing the satisfaction of the user.

The present invention described above can be embodied as computer readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like.

The above detailed description should not be construed as limiting in all respects but should be considered as illustrative. The scope of the present invention should be determined by reasonable interpretation of the appended claims, and all changes within the equivalent scope of the present invention are included in the scope of the present invention.

What is claimed is:

1. An artificial intelligence (AI) cleaner comprising:
   a memory;
   a movement detect sensor configured to sense a movement of the AI cleaner by a user, wherein the movement detect sensor comprises a floor detect sensor configured to emit an infrared ray and measure a time that is spent in a return of the infrared ray;
   at least one wheel driver configured to allow the AI cleaner to be moved; and a processor configured to:

operate the AI cleaner in a first cleaning mode;

determine that the AI cleaner has been lifted and is currently moved by the user based on the measured time being equal to or greater than a preset time;

acquire a position to which the AI cleaner has moved based on determining that the AI cleaner has been lifted and is currently moved by the user; and control the at least one wheel driver to allow the AI cleaner to, in a second cleaning mode, clean a priority cleaning area corresponding to the acquired position.

2. The AI cleaner of claim 1, wherein the processor acquires the position of the AI cleaner when sensing the movement of the AI cleaner by the user in a state that the AI cleaner has not detected an obstacle.

3. The AI cleaner of claim 2, wherein the processor controls the AI cleaner to perform a cleaning job in the first cleaning mode if the movement of the AI cleaner by the user is sensed in a state that the AI cleaner has detected an obstacle.

4. The AI cleaner of claim 1, wherein the processor determines a circle area having a predetermined length as a radius around the acquired position of the AI cleaner, as the priority cleaning area.

5. The AI cleaner of claim 1, wherein the processor stores the acquired position to which the AI cleaner has moved, in the memory, and if it is sensed that the AI cleaner has moved to the position by the user by a predetermined number of times or more, the processor determines the priority cleaning area as a cleaning interest area, and wherein, if the AI cleaner enters the cleaning interest area while cleaning along a cleaning route in the first cleaning mode, the processor changes the first cleaning mode to the second cleaning mode.

6. The AI cleaner of claim 1, wherein the first cleaning mode is a general cleaning mode, and the second cleaning mode is a meticulous cleaning mode.

* * * * *